Feb. 27, 1923.
H. R. BENSON.
CHOKER HOOK.
FILED MAY 31, 1921.
1,446,781.
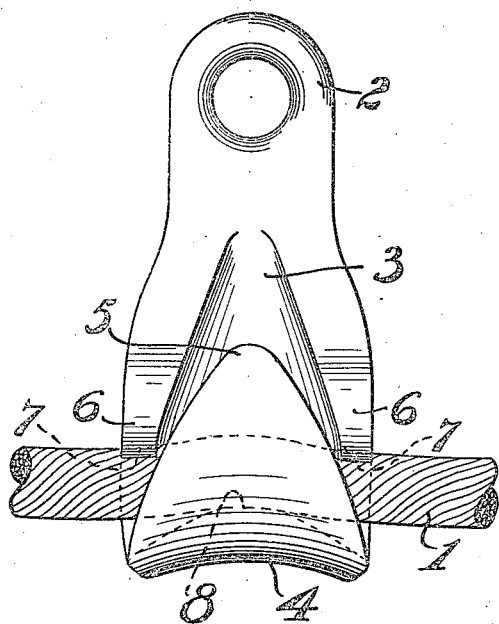
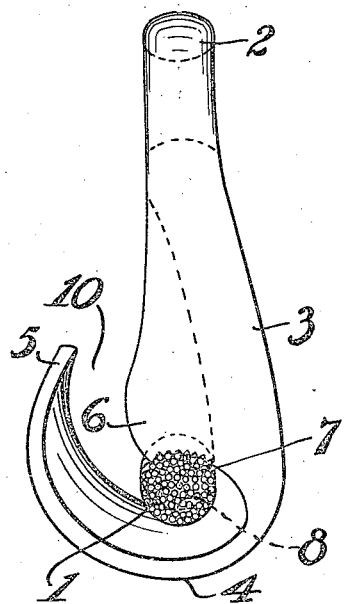
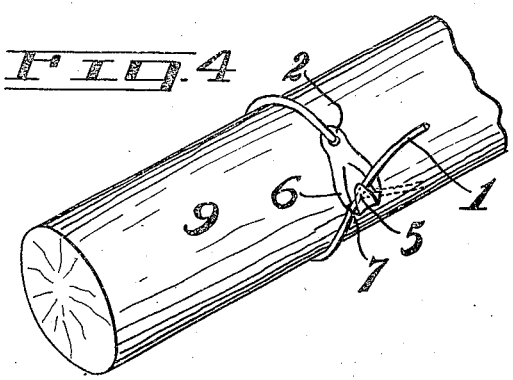
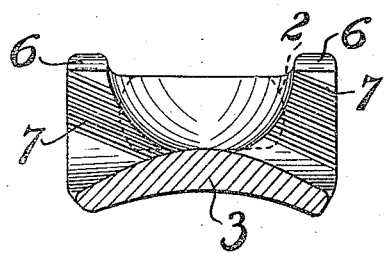
Inventor
Henry R. Benson
By W. L. & C. L. Reynolds
Attorneys Patented Feb. 27, 1923.

1,446,781

UNITED STATES PATENT OFFICE.

HENRY R. BENSON, OF SEDRO-WOOLLEY, WASHINGTON.

CHOKER HOOK.

Application filed May 31, 1921. Serial No. 473,980.

*To all whom it may concern:*

Be it known that I, HENRY R. BENSON, a citizen of the United States of America, and resident of the city of Sedro-Woolley, Skagit County, State of Washington, have invented certain new and useful Improvements in Choker Hooks, of which the following is a specification.

My invention relates to hooks such as are used in logging and land clearing operations and which are known as choker hooks.

The principal object of my invention is to provide a choker hook from which the line will not slip when slackened.

Another object of my invention is to provide such a choker hook with which the line may be easily engaged and which is without latches or other movable and breakable parts.

My invention comprises those novel parts and combinations and arrangements thereof which are shown in the accompanying drawings, described in the specification, and particularly defined by the claims terminating the same.

In the accompanying drawings I have shown my invention in the form which is now preferred by me.

Figure 1 is an elevation of my hook with a line shown in place therein.

Figure 2 is an elevation of the same hook and line, taken at right angles to Figure 1.

Figure 3 is a section through the shank of the hook near the bend, looking toward the eye.

Figure 4 is a perspective of my device attached to a log.

Choker hooks such as my invention relates to are secured upon the end of a choker line 1, as shown in Figure 4. The line passes from the eye of the hook about a log which is to be drawn off by the line, and then passes through the bend of the hook, and thence to a hauling line. Such hooks will hold readily while a strain is on the line, but if the choker line 1 is slackened the hook is easily and often accidentally disengaged therefrom. Hooks have been provided with latches and other means of positively locking the line in the hook, but these devices are not easily operated, either in securing the line or releasing it, they add greatly to the expense of the hook, and they are easily broken with the rough usage to which they are subjected.

By my invention I propose to provide simple means in connection with the ordinary type of choker hook which will permit the line to run readily through the hook under the strain, but which will grip the line when the latter is slackened to prevent release of the hook therefrom. In most respects the hook may be similar to the choker hooks now in use. It is provided with an eye 2, a broad shank 3, bend 4, and point, 5, which are similarly arranged as in the ordinary choker hooks. The point 5 may depart slightly from the usual design in that it is slightly more pointed, as may be seen in Figure 1.

Adjacent the side edges of the shank 3 and adjacent the bend 4 of the hook, I provide a pair of lugs 6. These lugs rise from the shank towards the point 5 and are provided with shoulders 7 which face towards the bend 4. The central portion 8 of the bend 4, lying between the side edges of the hook, is projected towards the general plane of the two shoulders 7. There is thus formed between the shoulders 7 and the central portion 8 of the bend, a cable-receiving passage which, for the size of cable intended to be employed with any particular hook, is not large enough to permit the cable to extend straight therethrough. The cable 1 must be kinked or bent into a slightly sinuous position to lie in the cable-receiving passage of the hook.

The entrance 10 leading from the point of the hook to this cable-receiving passage, is left open and unobstructed. To enter a cable therethrough it may be, and preferably is, necessary to bend the cable slightly. In practice the cable would be engaged under one of the shoulders 7 and under the point 5 of the hook, as shown in full lines in Figure 4. Upon being placed under tension, the drag of the log 9 will cause the cable to be drawn into the bend of the hook and to be engaged under the other shoulder 7 as shown in dotted lines in Figure 4.

So long as the line 1 is under tension it will bend about the portion 8 of the bend, and being thus drawn away from the shoulders 7, it may run freely through the hook. When the tension on the cable is relieved and on account of the inherent stiffness of the cable, the line will, in slackening, engage the shoulders 7. Being kinked as shown in Figure 1, it will be firmly held so that it may not run further through the hook. To facilitate this gripping action of the shoulders 7, they may be corrugated as shown in Figures 2 and 3 to correspond to the strands of the cable employed. These corrugations will assist in the gripping action.

A hook so formed has no moving parts, and no parts requiring machining. The entrance of the cable thereto is not obstructed, and it may be easily removed by slightly bending the line to disengage it from the shoulder 7. The lugs 6, being formed of the same material as the hook, and integral therewith, are as strong as the hook itself, and are not liable to be broken off in use. They offer no surface which might be caught by roots or branches, whereby the hook might be entangled or the choker line broken.

What I claim as my invention is:

1. A choker hook having a transversely-extending cable-receiving passage therethrough at its bend, and sinuous in a plane substantially parallel to the hook shank, the entrance to said passage from the point of the hook being open and of a size to permit free entrance of a cable therethrough.

2. A choker hook having a sinuous transversely-extending cable-receiving passage therethrough at its bend, the entrance to said passage from the point of the hook being open to permit entrance of a cable and curved both transversely and longitudinally of the hook.

3. A choker hook having lugs with cable-engaging surfaces facing towards the bend of the hook, and located at the side edges of its shank adjacent the bend, a portion of the hook at the bend between its side edges being projected towards the general plane of said cable-engaging surfaces, to form with said lugs a sinuous transversely-extending cable-receiving passage, the entrance to said passage from the point of the hook being unobstructed and of a size to permit entrance of a cable therethrough.

4. A choker hook having lugs projecting at each side of the body into the space between the hook body and its point, the inside face of the hook point being convexly rounded transversely and the edges of said lugs being spaced away from the adjacent side edges of the hook point to permit passage of the rope, the ends of the lugs towards the bend of the hook being shouldered to permit the rope to be seated thereunder.

5. A choker hook having lugs projecting from the face of its body which faces toward the tip of the hook, said lugs being separated to be outside of the side marginal lines of the hook tip and having their ends which are towards the bend of the hook shouldered to receive the line thereunder.

6. A choker hook having a broad flat shank and flanges along the side margins of the shank extending into the space between the shank and the hook tip, said flanges terminating a short distance inward from the bottom of the hook opening to form shoulders transversely alined with the bottom of said opening, the hook tip having a transversely curved inner face the central longitudinal line of which approaches near enough to the plane of the outer faces of the flanges to require bending of the line when inserting or removing it.

Signed at Seattle, King County, Washington, this 24th day of May, 1921.

HENRY R. BENSON.